United States Patent [19]

Acosta

[11] 4,240,758
[45] Dec. 23, 1980

[54] METHOD AND APPARATUS FOR ESTABLISHING TAB SETTINGS AND INDEXING PARAMETERS, AND PRINTOUTS REPRESENTING SAME, FOR A WORD PROCESSING SYSTEM

[75] Inventor: Robert G. Acosta, Austin, Tex.

[73] Assignee: International Business Machines Corporation, Armonk, N.Y.

[21] Appl. No.: 884,055

[22] Filed: Mar. 6, 1978

[51] Int. Cl.³ .................................... B41J 5/30
[52] U.S. Cl. .................................... 400/279; 400/63; 400/70; 400/76; 364/900
[58] Field of Search .................. 400/61, 62, 63, 64, 400/74, 76, 279, 280, 281, 282, 697, 70; 364/900

[56] References Cited

U.S. PATENT DOCUMENTS

| | | | |
|---|---|---|---|
| 2,762,485 | 9/1956 | Bafour et al. | 400/76 X |
| 2,947,357 | 8/1960 | Bafour et al. | 400/70 X |
| 3,015,377 | 1/1962 | Reitfort | 400/70 X |
| 3,045,218 | 7/1962 | Brand | 400/697 X |
| 3,611,308 | 10/1971 | Grinnell | 400/280 X |
| 3,675,216 | 7/1972 | James | 364/900 |
| 3,940,746 | 2/1976 | Vittorelli | 400/63 X |
| 3,952,852 | 4/1976 | Greek et al. | 400/76 X |
| 4,004,675 | 1/1977 | Ludwig | 400/281 |
| 4,031,996 | 6/1977 | Busch | 400/279 |
| 4,067,430 | 1/1978 | Wienhold | 400/279 X |

FOREIGN PATENT DOCUMENTS

| | | | |
|---|---|---|---|
| 1176441 | 1/1970 | United Kingdom | 400/279 |
| 1443050 | 7/1976 | United Kingdom | 400/279 |

OTHER PUBLICATIONS

IBM Technical Disclosure Bulletin, "Format Storage and Retrieval for Automatic Typewriter", Johnson, vol. 13, No. 8 Jan. 1971, pp. 2141-2142.
IBM Technical Disclosure Bulletin, "Alternate Tab Controls for Typewriter", McCray, vol. 18, No. 5 Oct. 1975, pp. 1511, 1512.
IBM Technical Disclosure Bulletin, "Tab Expansion in Line Memory of Typewriter", McCray, vol. 18, No. 5 Oct. 1975, pp. 1513, 1514.
IBM Technical Disclosure Bulletin, "Tab Stop Storage", McCray, vol. 18, No. 10 Mar. 1976, p. 3353.
IBM Technical Disclosure Bulletin, "Input Storage and Output Setting of Tabs", Tanner, vol. 15, No. 9 Feb. 1973, p. 2769.
IBM Technical Disclosure Bulletin, "Method of Tab Storage", Bowles et al., vol. 17, No. 1 Jun. 1974, pp. 131-132.

*Primary Examiner*—Ernest T. Wright, Jr.
*Attorney, Agent, or Firm*—John W. Henderson, Jr.

[57] ABSTRACT

Disclosed is a method and apparatus for establishing, verifying, and correcting tab settings and indexing parameters for text to be printed by a word processing system. The apparatus includes logic and related control networks for establishing a line of codes in memory indicative of the location and status of such tab settings and indexing parameters, for setting an electronic tab rack, for verifying and correcting such settings and parameters by, and responsive to, the advancement and backspacing of the printer carrier, and for producing a hard copy printout, during entry and playback, of such tab setting and indexing mode status.

7 Claims, 48 Drawing Figures

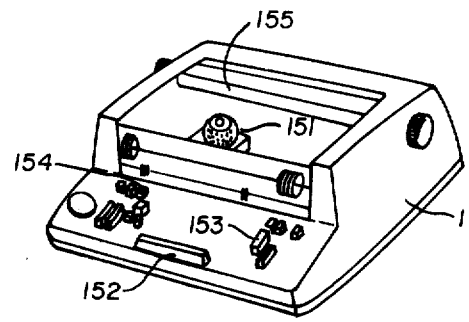
FIG. IA
PRIOR ART
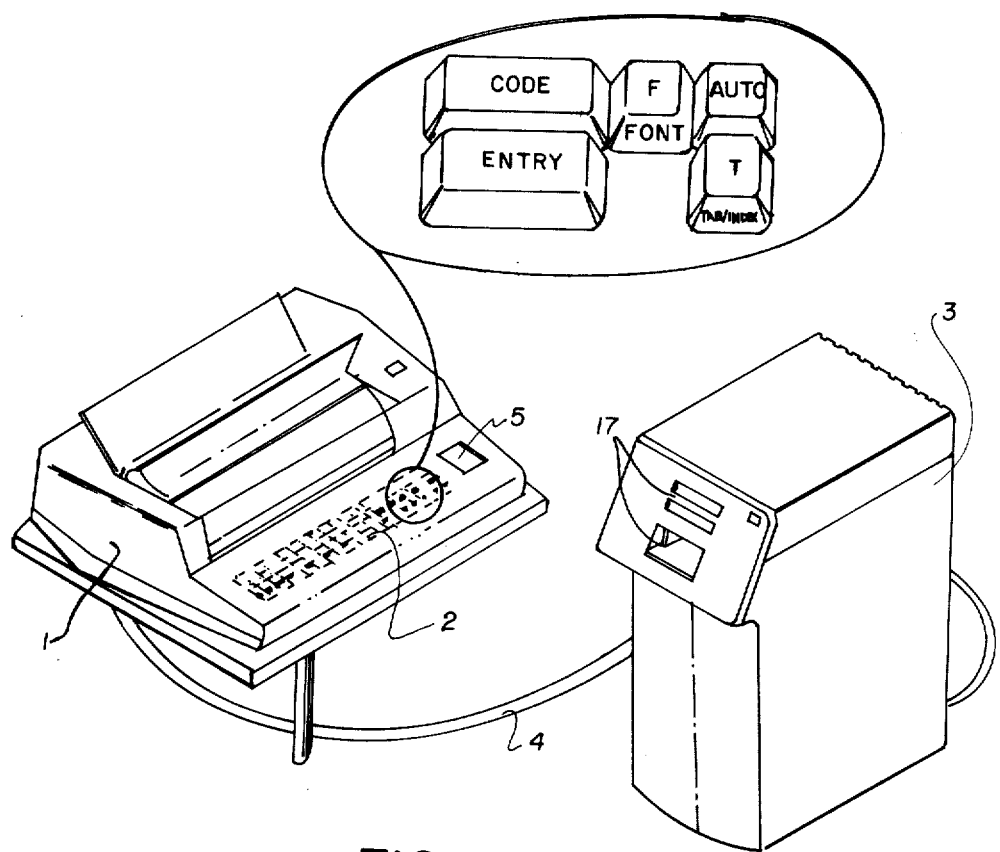
FIG. I

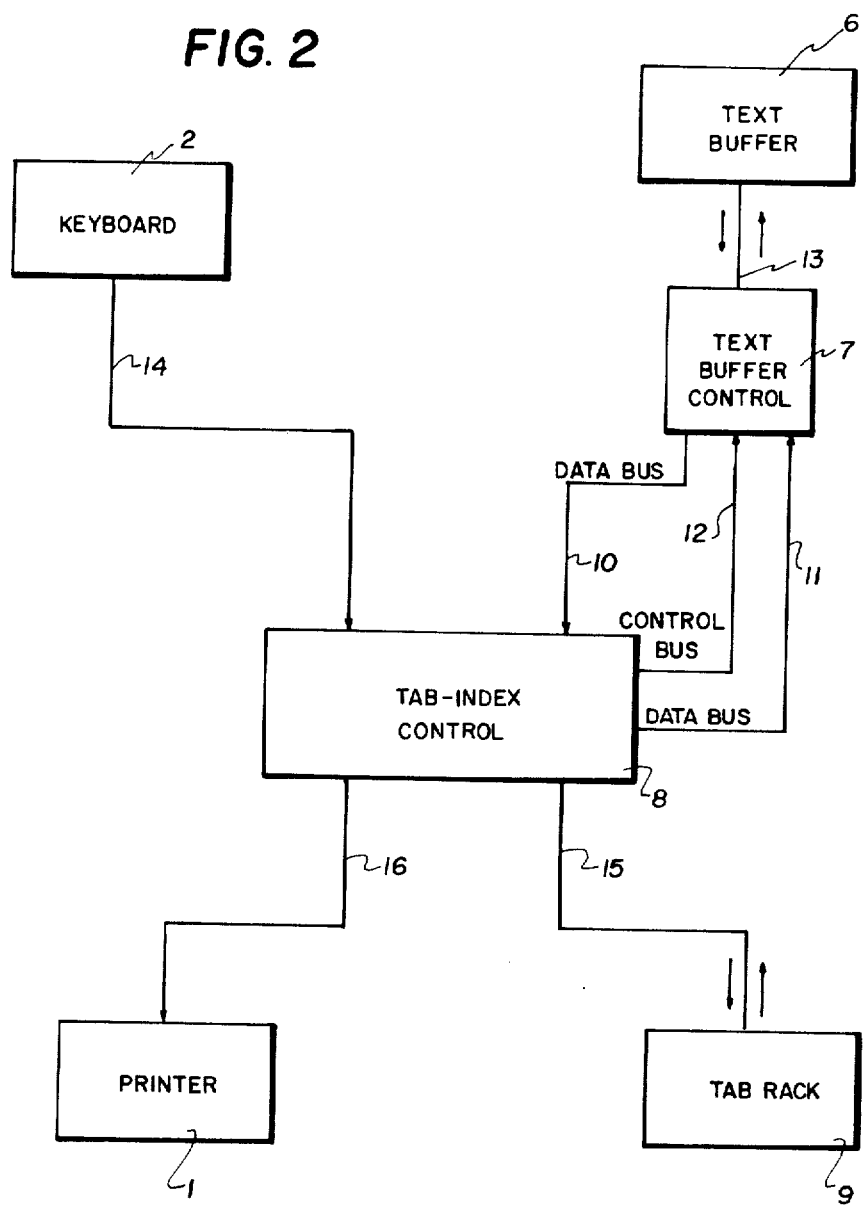

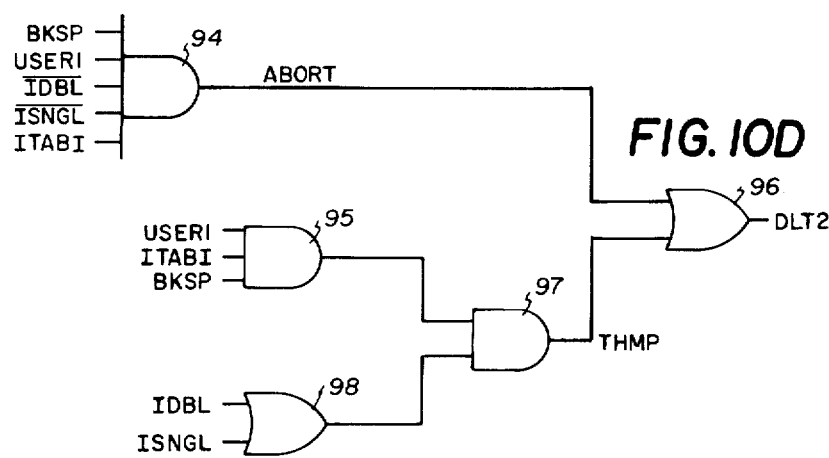
FIG. 10D
FIG. 10E
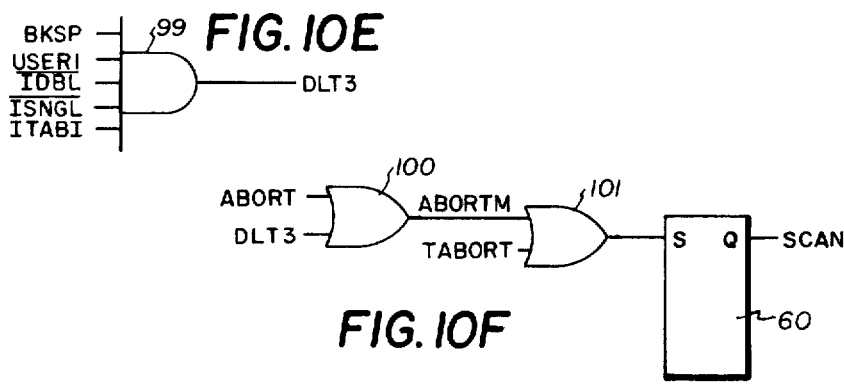
FIG. 10F
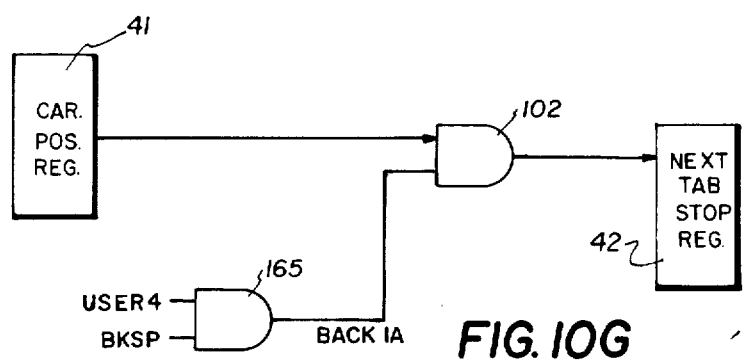
FIG. 10G

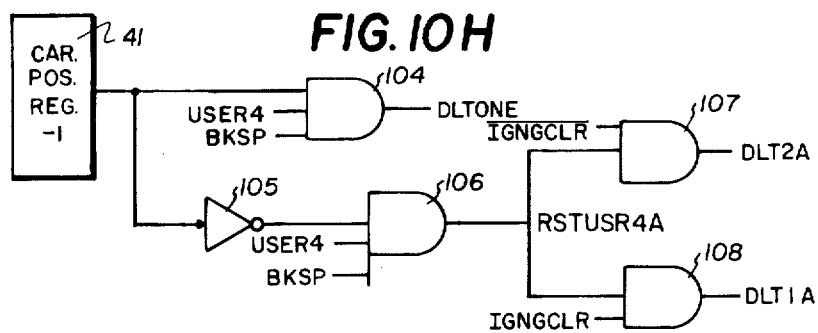
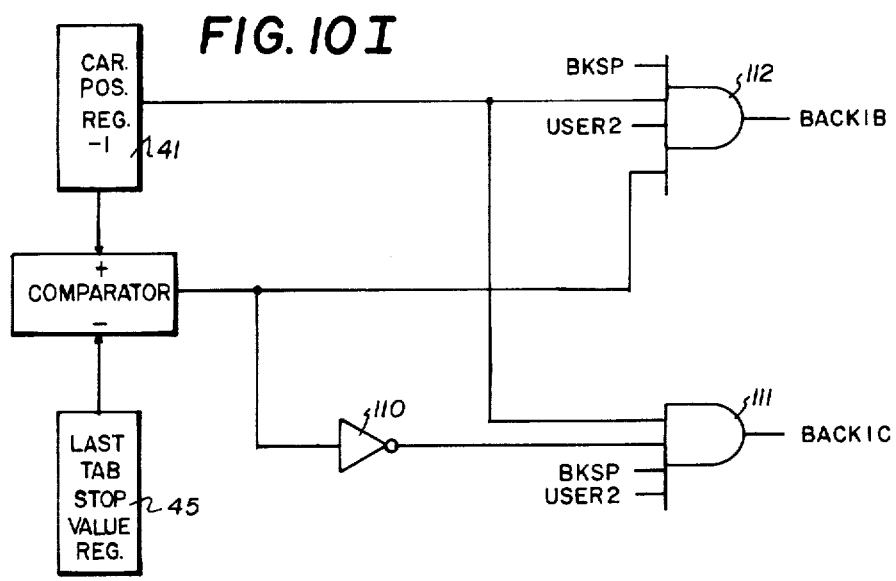
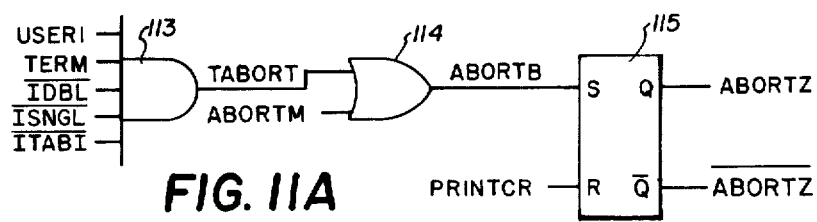

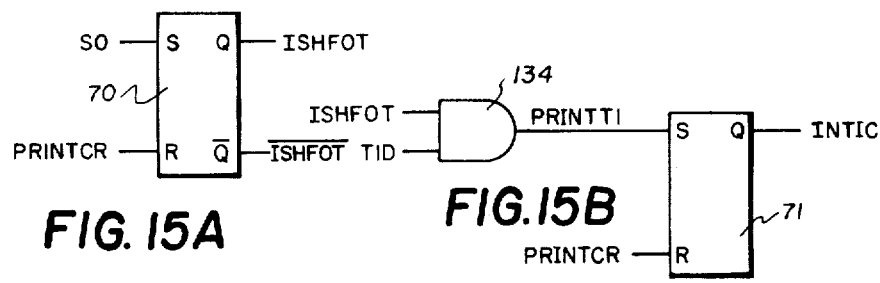
FIG. 15A   FIG. 15B
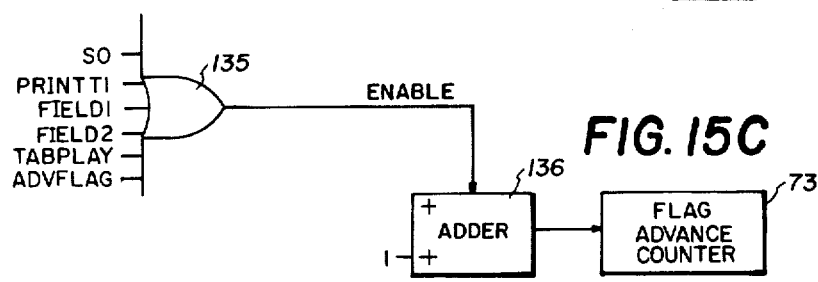
FIG. 15C
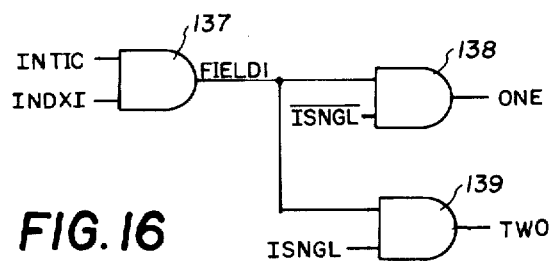
FIG. 16
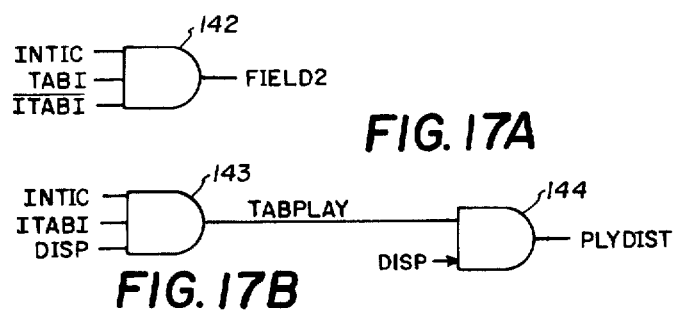
FIG. 17A
FIG. 17B

METHOD AND APPARATUS FOR ESTABLISHING TAB SETTINGS AND INDEXING PARAMETERS, AND PRINTOUTS REPRESENTING SAME, FOR A WORD PROCESSING SYSTEM

BACKGROUND OF THE INVENTION

This invention relates to word processing systems, more particularly to a method and apparatus for formatting the text to be automatically printed by a word processing system, and even more particularly to a method and apparatus for establishing the tab settings and indexing parameters creating such format for producing a preliminary hard copy printout of the status of such tab settings and indexing parameters.

Word processing systems of the type which enable high speed, error-free production of typewritten texts are well known in the art and conventionally include a typewriter/printer in communication with, and controlled by, a memory into which the text and instruction codes for formatting such text are inputted and stored. Accordingly, the operator of the word processing system prepares an initial draft of the desired text, as well as keying in certain instructions relating to the desired format and reproduction of such text, all of this data being inputted into the memory for subsequent processing. As a consequence, numerous changes and additions to the initially-drafted text may subsequently be effected, without the need for retyping unchanged portions of the text, with error-free final drafts of the text being produced in accordance with the desired format. The use of this type equipment therefore not only substantially reduces secretarial time, but also obviates the need for the preparer of the text to constantly review portions of the text that remain unchanged, to insure the omission of typographical errors therein.

While such word processing systems therefore offer considerable advantages over the non-automatic typewriters that they are designed to replace, there are specific problems that need to be overcome in order to optimize the advantages of such systems. Specifically, it is apparent that the accurate formatting of the text requires the quick and convenient inputting of correct instruction codes by the operator pertaining to desired tab stops and indexing (platen advance) parameters, as well as an effective way in which to change and/or verify existing tab stops and indexing modes. Furthermore, it would be desirable to enable the operator to "look into memory" to determine the status of existing tab stops and indexing parameters, and such can be accomplished by providing a hard copy printout (or display) of characters representative of such status.

OBJECTS OF THE INVENTION

It is therefore a principal object of the present invention to provide a new and improved method and apparatus for enabling the operator of a word processing system to accurately and rapidly format the text to be processed by such system.

It is another object of this invention to provide a new and improved method and apparatus for effectively and conveniently establishing, verifying, and correcting tab settings and indexing parameters associated with the formatting of text preliminary to the final printing of the text.

It is a still further object of the present invention to enable the operator of a word processing system, at virtually any stage of the operation of such system, to obtain preliminary hard copy printouts of representations of the location, identification, and/or status of tab stops and indexing modes.

SUMMARY OF THE INVENTION

In accordance with these and other objects, the present invention is directed to a method and apparatus for establishing the desired tab settings and indexing parameters for text to be printed by the word processing system by establishing a Tab Index Line which results in the entry of appropriate codes into memory signifying, and indicating the status of, the tab settings and indexing parameters, as well as setting an electronic tab rack. In accordance with specific features of the present invention, the indexing parameters and tab settings may be verified and corrected, during virtually any stage of the processing sequence, by advancing and backspacing the carrier in the manner, and with the consequent result, subsequently described. Furthermore, the establishment of the Tab Index Line produces, both upon entry and playback, preliminary hard copy printouts of representations of the location, identification, and status of the tab stops and indexing modes.

BRIEF DESCRIPTION OF THE DRAWING

Specific features of the invention, as well as additional objects and advantages thereof, will become readily understood from the following detailed description taken in conjenction with the accompanying drawing, in which:

FIG. 1 is a pictorial illustration of word processing equipment, particularly depicting a typewriter/printer and control console thereof, along with an enlarged fragmentary view of a portion of the keyboard of the printer;

FIG. 1A is a pictorial illustration of a prior art typewriter.

FIG. 2 is a block diagram representing the functional modules of the apparatus, as well as representing the data flow in accordance with the basic concept, of the present invention; and FIGS. 3, 4A, 4B, 4C, 4D, 5A, 5B, 6A, 6B, 7A, 7B, 7C, 7D, 7E, 7F, 8A, 8B, 9, 10A, 10B, 10C, 10D, 10E, 10F, 10G, 10H, 10I, 11A, 11B, 11C, 11D, 12, 13, 14, 15A, 15B, 15C, 16, 17A, 17B, 18A, 18B, 19, 20, 21 and 22 depict logic and related control circuitry of a preferred form of apparatus effective to provide the basic operation of the present invention.

DESCRIPTION OF PREFERRED EMBODIMENT

Figure 3:
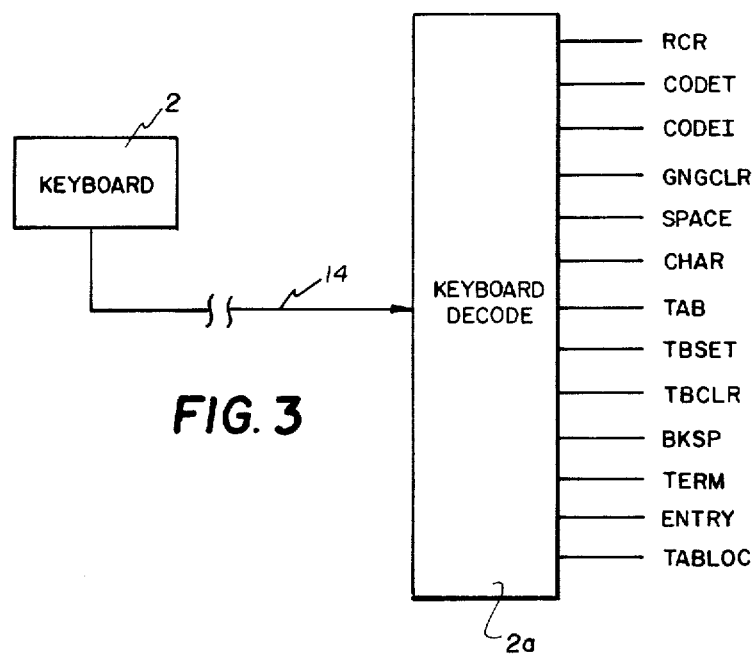

Referring initially to FIG. 1, a word processing system of the type generally known in the art, and with respect to which the present invention has particularly applicability, is broadly depicted as including a typewriter/printer 1 with a keyboard 2, the printer 1 being in two way communication with a console 3 by way of cable 4. Disposed within the console 3 are memory and control networks for automatically recording operator-generated text and instruction codes for subsequent automatic playout of the text by the printer in accordance with the desired format. FIG. 1A is a more detailed drawing of a conventional typewriter as shown in FIG. 1 of U.S. Pat. No. 3,592,310. The typewriter includes space bar 152 and tab key 154 for effecting movement of the carrier 151 rightward relative to the platen 155. Carrier return key 153 effects movement to the carrier 151 leftward relative to the platen 155.

As conventionally known, the operator of the word processing system utilizes the keyboard 2 not only to type the desired text, but also to enter the various instruction codes pertaining to the desired arrangement or format of the text and to initiate the respective operational modes of the system. Thus, and as indicated in FIG. 1, certain keys or buttons of the keyboard 2 would be provided (when depressed) for inputting operational modes (AUTO, LINE, ENTRY, CODE, etc.) while others can be assigned to both text character and instruction code generation (illustrated example of "T" and "TAB/INDEX"). It is to be understood that the orientation of the keys depicted in FIG. 1 is only illustrative and does not necessarily represent their actual orientation.

The printer 1 may also include an operator message panel 5 for displaying information to the operator as to what activity is occurring in memory; and the console 3 would normally include entry and exit openings 17 for magnetic cards of the type known as IBM Mag Cards upon which the coded text and instructions, etc. can be recorded for later use.

In accordance with the conventional use of the word processing system of FIG. 1, the operator would normally initially "key in" certain format instructions (such as line length, tab locations, and indexing (line spacing) requirements) and thereafter type the initial draft of the text. The text and associated instruction codes are transmitted and stored within the memory in the console 3 so that, after corrections or insertions are made to the initial draft, the final form of the text may be automatically printed with a minimum of operator intervention and in accordance with the desired format.

ESTABLISHMENT OF TAB SETTINGS AND INDEX PARAMETERS

In accordance with the improvement represented by the present invention, the word processing system operator, at the beginning of, and at various times during, the particular job, and by depression of the appropriate keys of the keyboard 2, is able to establish the desired tab settings and indexing parameters (single or double spacing, for example) applicable to the particular job, the memory and control logic of the apparatus of the invention retaining and processing this data in a manner which eliminates the need for repetitive re-entry of, and quick and convenient verification and/or changes to, these tab settings and index parameters at any time during the course of the job (even though multiple magnetic cards or other segmented magnetic media is employed). Additionally, and in accordance with the subsequent detailed explanation, the method and apparatus of the present invention results in the production of a hard copy printout of the status of the tab settings and indexing parameters.

Prior to such detailed explanation, however, it will be helpful to define certain terms which are utilized hereafter, as follows:

| | |
|---|---|
| Text Characters | Hard copy printout of alpha-numeric making up printed text |
| Code Characters | Individual printed letters representing hard copy image of components of Tab-Index Line |
| Entry Mode | Operational mode of word processing system for receiving data into memory |
| Entry Mode Playback | Operational mode for word processing system for playing back data from memory |
| Copy Mode Playback | Operational mode of word processing system for playing back final text |
| Tab-Index Line | String of coded data in memory representing the location of tab settings (stops) and indexing parameters (platen advancements); represented on hard copy printout as line of printed code characters respectively indicative of tab and indexing status |
| Tab-Index Line Keying Mode | Operational mode of word processing system for receiving Tab-Index Line data into memory |
| Tab-Index Line Playback Mode | Operational mode of word processing system for playing back Tab-Index Line data from memory |
| Shift Out Code | First of series of two codes, indicating that a Tab-Index Line is being processed; represented by code abbreviation SO |
| Tab-Index Identifier Code | Second of series of two codes in memory indicating that a Tab-Index Line is being processed; represented by code abbreviation TID |
| Index Identifier Code | Code in memory representing unit indexing parameter (instructing advancement of platen by one increment); represented by code abbreviation INDXI |
| Tab Identifier Code | Code in memory separating index parameters and tab location data in memory; represented by code abbreviation TABI |
| Tab Displacement Code | Code in memory representing actual location of tab stop; represented by code abbreviation DISP |
| Format End Code | Code in memory representing end of Tab-Index Line; represented by code abbreviation FMTEND |

In addition, it will be useful to initially define certain command signals generated (FIG. 3) by a keyboard decode module 2a, the circuitry within the decode module 2a being conventional for generating the so-coded switching signals in response to the depression of corresponding keys or buttons on keyboard 2. These preliminary keyboard "command" signals are as follows:

| | |
|---|---|
| ENTRY | Coded signal generated in response to operator initiating Entry Mode |
| CHAR | Coded signal generated in response to operator initiating character (alpha/numeric) processing |
| SPACE | Coded signal generated in response to operator instructing carrier escapement (space) from keyboard |
| TAB | Coded signal generated in response to operator initiating carrier escapement to next tab location (unless terminated by depression of tab locate key) |
| TABLOC | Coded signal generated in response to operator terminating carrier escapement (initiated by depression of tab key) at location of desired tab location |
| RCR | Coded signal generated in response to operator initiating required carrier return (to left margin) |
| CODET | Coded signal generated in response to operator (at keyboard) initiating Tab-Index Line |
| CODEI | Coded signal generated in response to operator instructing the entry of a single unit indexing parameter; multiple indexing parameter requires repeated depression of this key |
| GNGCLR | Coded signal generated in response to operator initiating a tab gang clear command at the keyboard. |
| TBSET | Coded signal generated in response to operator keying in a tab stop at the location where the carrier is stopped |
| TBCLR | Coded signal generated in response to operator instructing the clearance of a tab stop at the location where carrier is stopped |
| BKSP | Coded signal generated in response to operator instructing backspacing of carrier |
| TERM | Coded signal generated in response to operator terminating Tab-Index Line |

Specifically, the keyboard 2 is in communication with a tab/index control module 8, the control module 8 containing logic networks, the respective details and operations of which are subsequently described, for decoding and processing the tab stop and indexing instruction codes, for routing such data to and from memory within a text buffer 6 (by way of text buffer control 7), for setting and clearing tab settings within a tab rack 9, and for instructing and controlling the hard copy printout of the code characters representing the status of the tab grid and indexing parameter data by the printer 1.

A detailed description of the design and operation of the text buffer 6 and text buffer control 7 is not necessary for an understanding of the present invention, one suitable arrangement being described in U.S. Pat. No. 3,675,216, it being sufficient for the purposes of the present description to note that the buffer 6 is essentially a memory, preferably of the recirculating dynamic shift register type, for storing inputted text and instruction codes with a control flag (BYTE) associated with such data advanced, under the control of the text buffer control 7, to manipulate the data through and out of the text buffer 6. The tab rack 9 is a random access memory in which the desired tab grid is set and cleared in accordance with the subsequently described operation and which, in combination with the text buffer memory 6, enables the convenient setting of and changes to automatic tab stops by the operator.

When the word processing system is in the Entry Mode, and during operator keying of the respective tab settings and indexing parameters (Tab-Index Line Keying Mode) the resulting data is inputted from the keyboard 2 to the tab index control module 8 along input bus 14. The control module 8 decodes and formats such data (Tab-Index Line) for storage in the text buffer 6, by way of the twoway data bus 13, sets up the indexing modes, establishes and/or clears the tab setting stops within the tab rack 9, produces the hard copy printout of the code characters representative of the status of the indexing parameters and tab settings, and controls the advancement and return of the carrier 151 (carriage) of the Printer 1. During the preliminary and final playback modes (Entry Mode Playout and Copy Mode Playout), the data from the text buffer 6 is decoded and processed by the control module 8, with such text buffer data being employed to set up the indexing modes and tab stops, as well as controlling (by way of bus 16) the printing of code characters by printer 1. Data to and from the tab rack 9 is transmitted along bus 15, data to and from the text buffer 7 and control module 8 being along data buses 10 and 11 with control signals to the text buffer control 7 being transmitted along bus 12.

TAB-INDEX LINE KEYING MODE

Initiation of Tab-Index Line

The Tab-Index Line is initiated by the operator keying (at keyboard 2) a coded T [depression of CODE and "T" portions (FIG. 1)] while the system is in Entry Mode. Assuming that the carrier 151 is at the left margin and other subsequently indicated prerequisite conditions are met, the Shift Out Code and the Tab-Index Identifier Code are inserted (by control module 8) into the text buffer memory 6, such codes signifying in memory the beginning of the Tab Index Line. At the same time, a code character (in this example a "T") is printed as the first character, and at the left margin, to signify to the operator the beginning of the Tab-Index Line. The code character "T" is printed without carrier escapement.

Once the Tab Index Line has been initiated (and the confirmation of same has been indicated to the operator by the printing of the code character "T"), the system is ready to receive the indexing parameters, a gang clear command to clear any grid existing in the tab rack 9, and/or the entry of new tab settings.

Entry of Indexing Parameters

The operator then inputs the desired indexing parameters for the platen 155 (single, double space, etc.) by keying an appropriate number of coded i's, i.e., one CODEI (FIG. 3) for single space, two CODEI's for double indexing, etc. At this point in time, the carrier 151 is at the left margin (the "T" having been printed with non-escapement); and the CODEI entry (or entries) consequently enters the appropriate number of Index Identifier Codes into memory (the text buffer 6). Rather than effecting a printout at this time to give a visual indication of the entry of an index parameter(s), the printer 1 is caused to "thump" (space immediately followed by backspace), thus giving an audible indication to the operator of the indexing parameter entry and leaving the carrier 151 at the left margin.

Clearing of Tab Rack

Following the indexing parameter input, as previously described, the operator initiates a "tab gang clear command" (GNGCLR-FIG. 3) at the keyboard 2, which clears all tab stops then-existent in the tab rack 9. Such keying command, which is effected while the carrier 151 is still at the left margin, also inserts a Tab Identifier Code into memory (text buffer 6), and, under control of the control module 8, causes the printer 1 to again "thump" (thus leaving the carrier 151 at the left margin).

Entry of Tab Settings

At this point in time, the operator can set up the required tab grid. Accordingly, the operator initially advances the carrier 151 to the desired location where the particular tab stop is to be set. This carrier escapement is effected (as conventionally known) by continuously keying in an appropriate character (CHAR) or Space (SPACE) [thus incrementally advancing the carrier 151] or by depressing the "tab" key 154 (TAB) [the carrier 151 escaping until depression of the "tab locate" key (TABLOC) or until reaching a previously set tab] until the carrier 151 reaches the desired tab stop position. The escapement of the carrier 151 from the left margin consequently causes the Tab Identifier Code to be inserted into the text buffer memory 6 (unless one had already been inserted due to the previously described tab rack clearing operation).

When the carrier 151 has been so-positioned at the desired location, the operator depresses the appropriate key at the keyboard 2 to "set" the tab (TBSET). As a consequence, and unless the carrier 151 happens to be at a previously set tab stop, the particular tab stop is set in the appropriate location in the tab rack 9 and the Tab Displacement Code identifying the location of such tab is entered into the text buffer memory 6. In addition, a code character "t" is printed to the right of the code character "T" by the printer 1 (at the then-position of the carrier 151), this printing occurring without carrier escapement.

This procedure is repeated by the operator until the entire tab grid is established with the respective tabs being set at appropriate locations into the tab rack 9, the tab location data (DISP) entered into memory 6, and code character printing of the t's providing the operator with not only assurance that the various tab stops have been set, but also visually indicating the location of the tab stops along the Tab-Index Line as they exist in memory 6.

Verification of Existing Tab Settings

During the creation of the tab grid, as previously described, the operator may easily include or exclude (verify) any existing active tab stops which are encountered during the tab grid creation. Specifically, when the carrier 151 has been keyed to the location of an already existing tab stop (which is therefore present in the tab rack 9), a Tab Displacement Code representing the position of that tab stop is inserted into memory 6; and the code character "t" is automatically printed (at that carrier location) by printer 1. If the operator wishes to include that tab in the new grid, the tab setting process is continued, as before. On the other hand, if the operator wishes to delete that particular tab, the "tab clear" key is depressed (generation of TBCLR), resulting in the clearance of this tab from the tab rack 9 and the deletion of that particular Tab Displacement Code from memory 6. In addition, the existing code character "t" is at that time overstruck by a code character "o", thus signifying to the operator that this particular tab setting has been cleared from both tab rack 9 and memory 6. The code character "o" is printed without any carrier escapement.

Termination of Tab-Index Line

Upon the establishment of the desired tab grid, the operator effects termination of the Tab-Index Line by keying a carrier return. Upon such termination, and prior to the actual return of the carrier 151 to the left margin, the Format End Code (FMTEND) is entered in memory 6 and a code character is printed to signify the particular indexing parameter that had been previously inputted. For example, the code character "S" is printed for a single indexing parameter and a code character "D" is printed for a double indexing parameter.

It is to be noted that a termination may occur at any point during the creation of the Tab-Index Line with various consequences. For example, if the operator wishes to abort the Tab-Index Line at the very outset (before entry of indexing parameters), the carrier return is keyed directly after the coded T resulting in the Shift Out Code and Tab-Index Identifier Code being deleted from memory 6, the code character "T" being overprinted with the code character "o", and the carrier return effected.

Termination may also occur directly after the entry of the indexing parameters. Consequently, upon the operator instructing a carrier return at such point, the Format End Code is inserted into memory 6, the code character "S" or "D" (representing single or double indexing) is printed, and the carrier 151 is returned to the left margin. If a "gang clear" of the tab rack 9 had already been performed, the printer 1 prints the code character "c" immediately preceding the indexing code character "S" or "D".

The termination of the Tab-Index Line at any time the carrier 151 is away from the left margin is also effective to automatically clear all tab settings from the tab rack 9 which correspond to the tab setting locations to the right of the carrier position at the time of termination. It is to be noted that any time a Tab-Index Line is aborted, the tab rack settings (from a previous Tab-Index Line) are updated. It is also noted that indexing parameters, tab gang clear commands, and tab settings may be entered independent of each other or in combination, as long as they are entered in the sequence described previously.

Error Correct Backspacing

In accordance with a unique feature of the present invention, when the system is in the Tab-Index Line Keying Mode and any time up until termination of the Tab-Index Line, any error in a keyed entry may be corrected by an appropriate backspacing of the carrier 151. Specifically, when a backspace is keyed (BKSP) after a coded T, the Shift Out Code and Tab-Index Identifier Code (as well as the Tab Identifier Code if a tab gang clear sequence had been effected) are removed from memory 6, and the code character "T" is overstruck by the printer 1 with a code character "o". When a backspace is keyed after the entry of indexing parameters, all of the Index Identifier Codes are removed from memory 6, and the printer 1 is caused to "thump" to indicate to the operator the removal of such indexing codes.

At any point during the entry of the tab grid (and prior to termination), as previously described, the carrier 151 may be incrementally backspaced to (or past) an existing tab stop. As each such stop is reached, the particular Tab Displacement Code identifying the position of such tab is removed from memory 6, but is not removed from the tab rack 9 unless the operator specifically instructs the clearance of the tab from the rack 9 (TBCLR) in the manner previously described. Thus, when the operator again advances the carrier 151 to and through these tab settings, the particular Tab Displacement Codes identifying same are re-established into the memory 6. It is therefore apparent that a quick and convenient way is provided for the operator to insert additional tabs into the tab grid, remove those tab settings which are not desired, and carry out these operations during the initial creation of the Tab-Index Line.

It is to be understood that the previous description, insofar as it refers to the removal of codes from memory 6 forming part of the Tab-Index Line, only pertains to the particular Tab-Index Line being processed, the memory codes of a previously entered Tab-Index Line being unaffected by such removal (or aborted line).

TAB-INDEX LINE PLAYBACK MODE

During the Entry Mode Playback, initiated by ENTRY, and whenever a Tab-Index Line is first encountered (detection of SO), the printer 1 prints the code character "T" at the left margin; the Index Identifier Codes are processed; and if tab set information follows, the tab rack 9 is cleared. Thereafter, the tab rack 9 is set up in accordance with the Tab Displacement Codes outputted from memory 6, the carrier 151 "tabs" to each tab stop identified in the rack 9, and the printer 1 prints a code character "t" (without carrier escapement) at each tab stop location.

Thereafter, and after all tab stop locations have been so identified and printed, either the code character "S" or "D" is printed at the end of the line (depending upon whether single or double Index Identifier Codes had been previously processed). If no tab stops print out and a clearing of the tab rack 9 had occurred, the code character "c" is printed immediately before the "S" or "D". The carrier 151 then returns to the left margin, the platen 155 is indexed accordingly, and the system continues in Entry Mode Playback. When the Tab Index Line is encountered during Copy Mode Playback, the same aforementioned procedure occurs as during Entry Mode Playback with the exception that there is no printing of code characters.

The following Table I summarizes examples of various tab and index parameter setting procedures (and consequent results) carried out in accordance with the aforementioned description, wherein:

(1) represents the entry of a single indexing parameter and the clearance of the tab rack;

(2) represents the entry of only a double indexing parameter;

(3) represents the setting of a tab stop at six escapements (from the left margin); and (4) represents the re-entry of a single indexing parameter.

The sequence steps (5a)-(5c) are carried out whereby:

(5a) represents the setting of an additional tab stop at four escapements (5b) indicates that a backspace must be keyed to set another tab stop; and (5c) represents an additional tab stop being set at two escapements and the previously set tab stop (at four escapements) being verified (inserted into memory) by tabbing.

The sequence steps (6a)-(6d) are carried out whereby:

(6a) represents the tab rack being cleared;

(6b) shows a tab stop being set at three escapements;

(6c) shows backspacing to the left margin; and (6d) shows an "abort" sequence as a result of keying a backspace at the left margin.

The sequence steps (7a)-(7d) are carried out whereby:

(7a) represents the entry of a double indexing parameter;

(7b) represents the verification of two tab stops that already existed in the tab rack (verification was accomplished by keying the tab button twice);

(7c) represents the clearing of the last tab stop that was verified (the clearing was accomplished by keying the tab clear key);

(7d) shows that after clearance of the tab stop in (7c), two spaces were keyed, a tab stop set, and the line terminated.

The sequence steps (8a)-(8e) are carried out whereby:

(8a) represents the entry of a double indexing parameter;

(8b) represents verification of the first two tab stops that existed in the tab rack and inclusion of another tab stop by depression of the "tab set" button;

(8c) indicates backspacing to the left margin;

(8d) indicates that a backspace at the left margin deleted one of the indexing parameters originally keyed; and (8e) shows the verification (inclusion) of three tab stops that had been backspaced over in (8c) and the printing of an "S" as a consequence of backspacing over one of the index parameters in step (8d).

The sequence steps (9a) and (9b) are carried out whereby:

(9a) shows the carrier movement away from the left margin; and (9b) shows termination of the tab index line causing the rack to be cleared and the "Cs" to be printed.

TABLE I

| KEYED IMAGE | TAB RACK | INDEX STORAGE |
|---|---|---|
| (1) T(i) (gang clear)cS <br> TcS | tab rack cleared | Single |
| (2) T(i) (i)D <br> TD | no change to tab rack | Double |
| (3) D <br> T  iD | 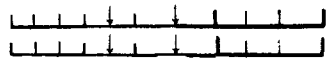 | Double |
| (4) T(i)S <br> TS | no change to tab rack | Single |
| (5a)Tt |  | |
| (5b)T t |  | |

TABLE I-continued

| | | | |
|---|---|---|---|
| (5c)T  t  t S | | ⊥⊥⊥⊥⊥⊥⊥⊥ | Single |
| T  t  t S | | | |
| (6a)T (gang clear) | | tab rack cleared | Single |
| (6b)T....t | | | |
| (6c)T....t | | ⊥⊥⊥⊥⊥⊥⊥⊥ | |
| (6d)S  t | | ⊥⊥⊥⊥⊥⊥⊥⊥ | Single |
| S  t | | | |
| (7a)T(i) (i) | | no change to tab rack | Single |
| (7b)T→t→t | | ⊥⊥⊥⊥⊥⊥⊥⊥ | |
| (7c)T  t | | | |
| (7d)T  t  D | | ⊥⊥⊥⊥⊥⊥⊥⊥ | Double |
| T  t  t D | | | |
| (8a)T(i) (i) | | no change to tab rack | Double |
| (8b)T→t→t | | ⊥⊥⊥⊥⊥⊥⊥⊥ | |
| (8c) | | no change to tab rack | |
| (8d)T | | no change to tab rack | |
| (8e)T→t→t→t S | | no change to tab rack | Single |
| T  t  t  t S | | | |
| (9a)T | | no change to tab rack | Single |
| (9b)T  cS | | tab rack cleared | Single |

| MEMORY IMAGE | PLAYBACK |
|---|---|
| (SO) (TID) (INDXI) (TABI) (FMTEND) | TcS |
| (SO) (TID) (INDXI) (INDXI) (FMTEND) | TD |
| (SO) (TID) (TABI) (DISP) (FMTEND) | T  tD |
| (SO) (TID) (INDXI) (FMTEND) | TS |
| (SO) (TID) (TABI) (DISP) | |
| (SO) (TID) (TABI) | |
| (SO) (TID) (TABI) (DISP) (DISP) (FMTEND) | T t t S |
| (SO) (TID) (TABI) | |
| (SO) (TID) (TABI) (DISP) | |
| (SO) (TID) | |
| Sequence erased from memory | No playback image |
| (SO) (TID) (INDXI) (INDXI) | |
| (SO) (TID) (INDXI) (INDXI) (TABI) (DISP) (DISP) | |
| (SO) (TID) (INDXI) (INDXI) (TABI) (DISP) | |
| (SO) (TID) (INDXI) (INDXI) (TABI) (DISP) (DISP) (FMTENT) | T t t D |
| (SO) (TID) (INDXI) (INDXI) | |
| (SO) (TID) (INDXI) (INDXI) (TABI) (DISP) (DISP) (DISP) | |
| (SO) (TID) (INDXI) (INDXI) | |
| (SO) (TID) (INDXI) | |
| (SO) (TID) (INDXI) (DISP) (DISP) (DISP) (FMTEND) | T t t t S |
| (SO) (TID) (TABI) | |
| (SO) (TID) (TABI) (FMTEND) | TcS |

There is now described the design and operation of a preferred form of apparatus (logic networks) effective to provide the previously described operation of the present invention. To facilitate a clear understanding thereof, a glossary of terms identifying certain significant ones of the various signals referred to in the following description and drawing is initially summarized as follows:

| | GLOSSARY OF SIGNAL TERMS |
|---|---|
| Line 1 | Control signal to printer code generator 26(FIG. 20) instructing print of code character "T" |
| Line 2 | Control signal to printer code generator 26 instructing printer' to "thump" |
| Line 3 | Control signal to printer code generator 26 instructing unit forward escapement of carrier 151 |
| Line 4 | Control signal to printer code generator 26 instructing printing of code character "t" with non-escapement of carrier 151 |
| BACK | Control signal to printer code generator 26 instructing backspace of carrier 151 |
| OPRINT | Control signal to printer code generator 26 instructing printing of code character "o" with non-escapement of carrier 151 |
| TABBING | Control signal to printer code generator 26 instructing |

-continued
GLOSSARY OF SIGNAL TERMS

| | |
|---|---|
| | carrier escapement to next tab location |
| PRINTC | Control signal to printer code generator 26 instructing printing of code character "c" |
| PRINTS | Control signal to printer code generator 26 instructing printing of code character "S" |
| PRINTD | Control signal to printer code generator 26 instructing printing of code character "D" |
| PRINTCR | Control signal to printer code generator 26 instructing carrier return. |
| FORCESO | Control signal generated when Shift Out Code (SO) is to be entered into memory 6 |
| FORCEID | Control signal generated when Tab-Index Identifier Code (TID) is to be entered into memory 6 |
| INDEX | Control signal generated when Index Identifier Code (INDXI) is to be entered into memory 6 |
| TABIG | Control signal generated when Tab Identifier Code (TABI) is to be entered into memory 6 |
| DISPL | Data generated when Tab Displacement Code (DISP) is to be entered into memory 6 |
| FORCEND | Control signal generated when Format End Code (FMTEND) is to be entered into memory 6 |

Figure 21:
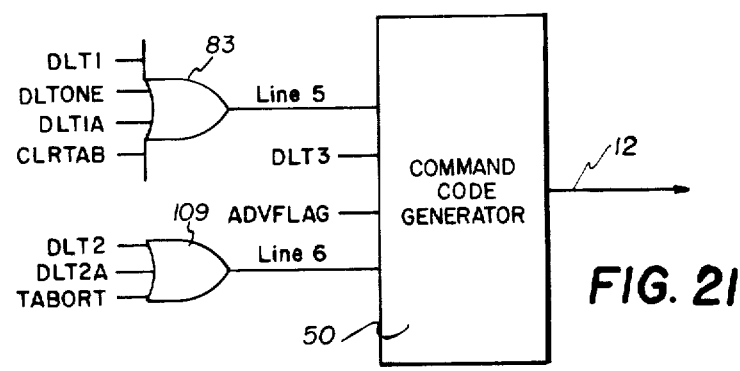
Figure 4A:
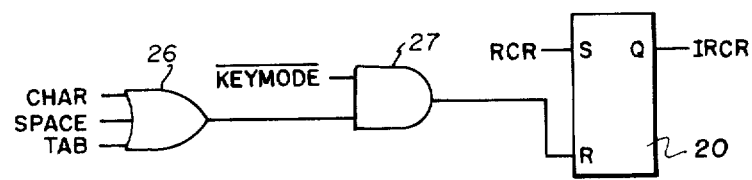
Figure 4B:
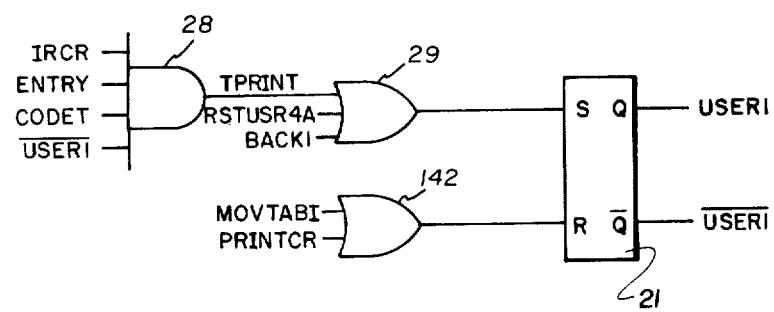
Figure 4C:
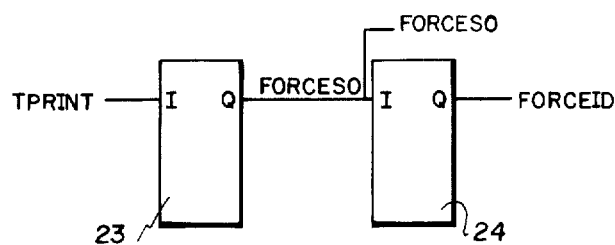
Figure 4D:
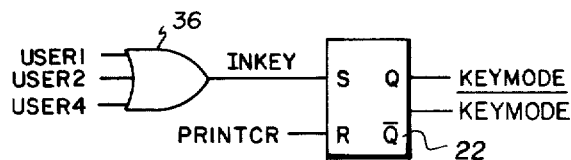

As previously described, the keyboard decode module 2a is effective to generate the signals corresponding to the keyed inputs from keyboard 2 (FIG. 3). Furthermore, the memory code generator 25 (FIG. 22) is effective to format the various codes to be entered into the text buffer 6 (memory) by way of the text buffer control 7. The control signal commands to the text buffer control 7 which manipulate the data (and flag) in the text buffer 6 are generated by the command code generator 50 depicted in FIG. 21. In this regard, the input signal Line 5 instructs the deletion of a single code; the input signal Line 6 instructs the deletion of two codes; and signal input DLT3 instructs the deletion of three codes; and the input signal ADVFLAG instructs a variable flag advance.

Figure 14:
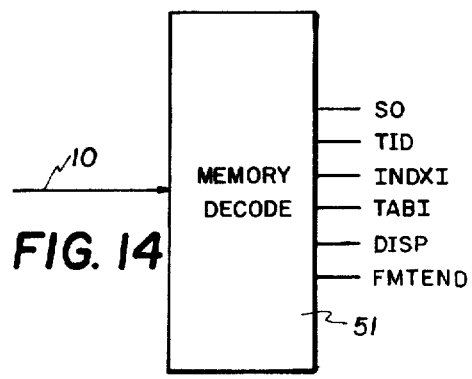
Figure 20:
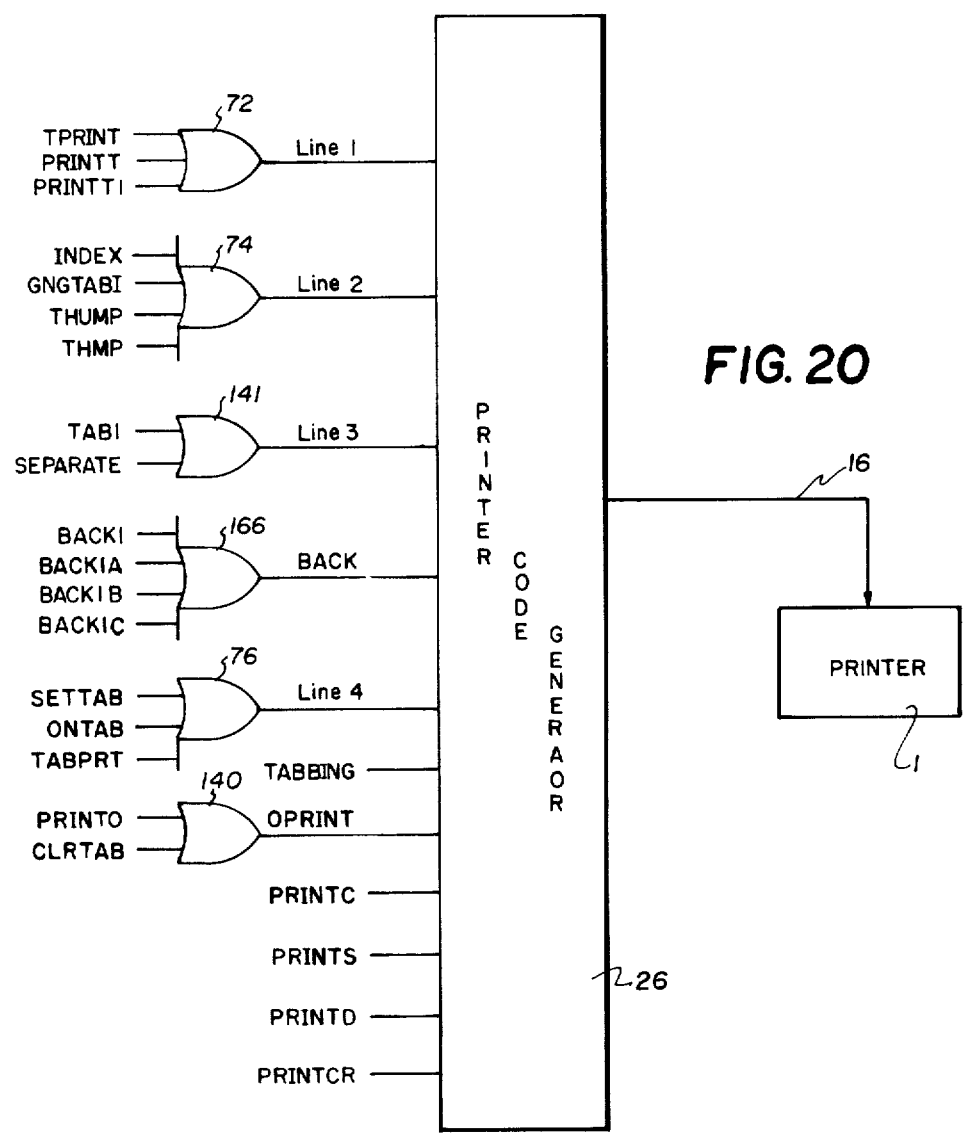

Data (codes) from the text buffer memory 6 during playout is decoded by a memory decode module 51 depicted in FIG. 14; and the respective printing and carrier return operations of the printer 1 are performed under control of the printer code generator 26 depicted in FIG. 20.

The logic networks for implementing the initiation of the Tab-Index Line during the Tab-Index Line Keying Mode are depicted in FIGS. 4A–4D. Accordingly, the latch 20 (when "set" by RCR and not reset by the signal conditions at the OR 26 and AND 27 gates depicted therein) assures that the carrier 151 is at the left margin. The combination of locating the carrier 151 at the left margin (IRCR), keying the ENTRY and CODET signals and not already being in the Tab-Index Line Keying Mode (USER1) gates AND gate 28 and OR gate 29 to set latch 21 which sets latch 22 through OR gate 36. The latch 21 (when set) signifies that the Tab-Index Line Keying Mode is in effect (USER1); and the latch 22 (when set) signifies that the system is in the keying phase of the Tab-Index Line (KEYMODE). Serially-connected shift registers 23 and 24 (FIG. 4C) generate control signals FORCESO and FORCEID, in response to TPRINT from AND gate 28, for entering the respective Shift Out Code (SO) and Tab-Index Identifier Code (TID) into memory 6 (memory code generator 25 of FIG. 22). Printer code generator 26 (FIG. 20) prints the code character "T" when Line 1 is "high", in response to the TPRINT signal at the input of OR gate 72.

Figure 22:
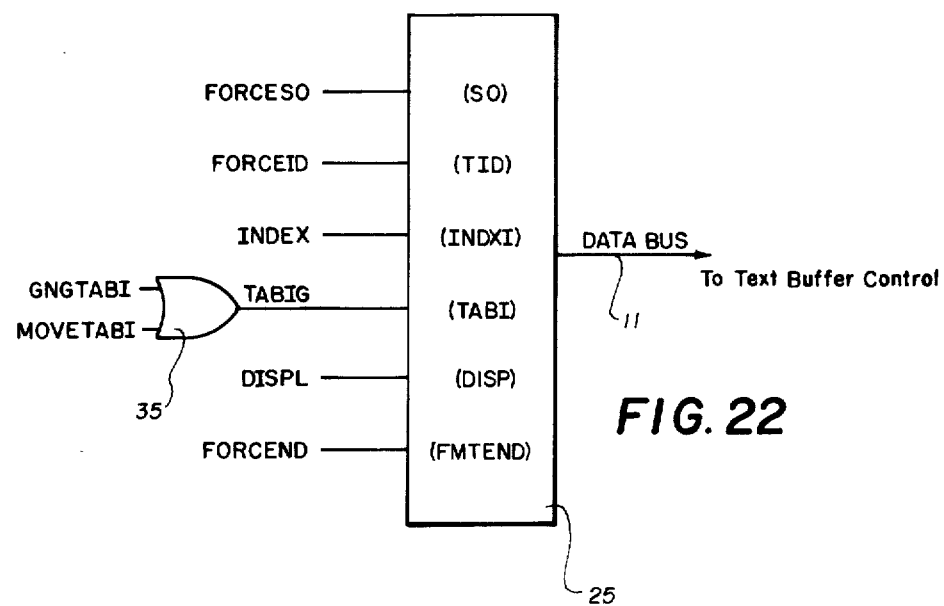
Figure 5A:
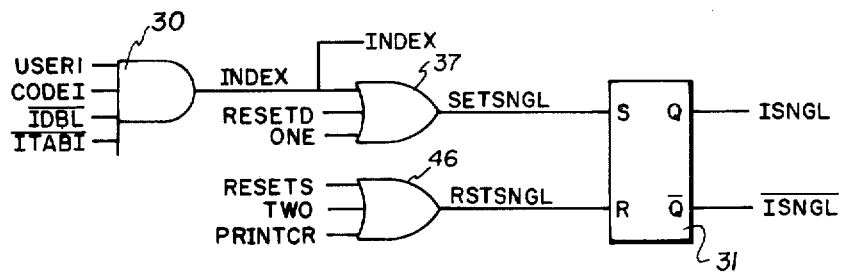
Figure 5B:
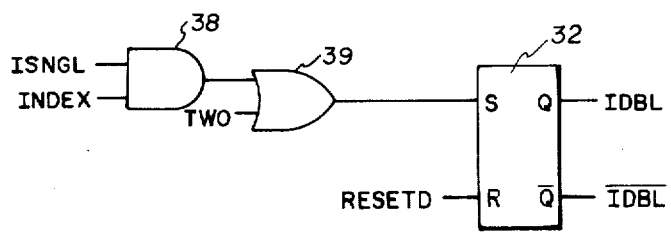

The logic networks applicable to the indexing parameter entry during Tab-Index Line Keying Mode (and index parameter processing during Tab-Index Line Playback Mode) are depicted in FIGS. 5A and 5B. The Tab-Index Line Keying Mode signal (USER1) and the keying of a CODEI at the keyboard 2 are input to AND gate 30 together with signals indicating that double indexing has not been set (IDBL) and no tab has been keyed (ITABI). Accordingly, AND gate 30 (when indicated input signal conditions are "high") generates the control signal INDEX, each time that such control signal is generated resulting in an Index Identifier Code (INDXI) being entered into memory 6 from the output of memory code generator 25 (FIG. 22). Latch 31 (FIG. 5A) which is set through OR gate 37, and latch 32 (FIG. 5B) which is set through AND gate 38 and OR gate 39 when a second CODEI is keyed, respectively reflect the existence of single and double indexing modes. Printer code generator 26 (FIG. 20) causes the printer 1 to "thump" when Line 2 is "high" in response to the INDEX signal at OR gate 74.

Figure 6A:
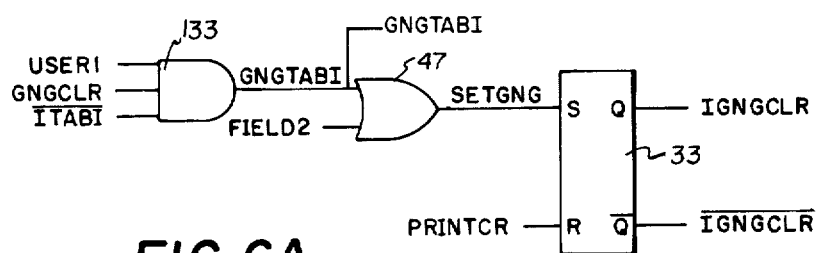
Figure 6B:
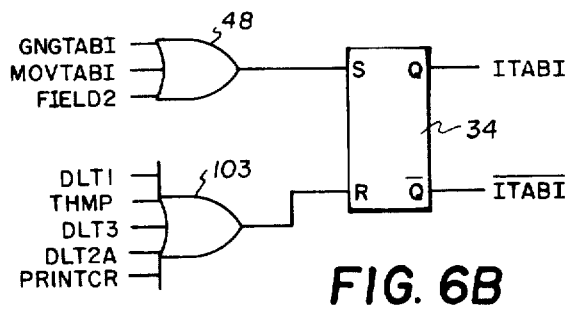

Among the logic networks employed for the initial clearance of the tab rack 9 (after keying of the index parameter data) are those depicted in FIGS. 6A and 6B. Accordingly, the signal GNGTABI generated upon the occurrence of the "tab gang clear command" (GNGCLR) [and other conditions at the inputs to AND gate 133] sets the gang clear latch 33 through OR gate 47 and is used to "set" the latch 34 through OR gate 48 (indicating the residence of the Tab Identifier Code in memory 6, as well as to generate the control signal TABIG (at the output of OR gate 35, FIG. 22) for inputting the Tab Identifier Code (TABI) into memory 6. The control signal GNGTABI is also utilized (FIG. 12) to clear the tab rack 9 through OR gate 61, as well as to cause Line 2 to go "high" through OR gate 74 (FIG. 20), causing the printer 1 to "thump".

The logic control networks for controlling the carrier movement during the entry of tab settings is depicted in FIGS. 7A–7F. Aside from the generation of the various internal control signals, as depicted in these figures, specific reference is initially directed to FIG. 7F whereby the setting of the latch 40 signifies (USER2) that the carrier 151 has been moved away from the left margin. The latch 40 is set by keying of a character, space or tab on the keyboard 2 which is decoded by keyboard decode 2a in FIG. 3 and input to OR gate 49. The CHAR, SPACE or TAB signal is gated through AND gate 53 or AND gate 163 by the KEYMODE signal from latch 22 and sets the latch 40 through OR gate 54. The AND gate 163 is activated by the ITABI signal from latch 34 (FIG. 6B) which indicates that no tab information was previously entered into memory 6.

Figure 7A:
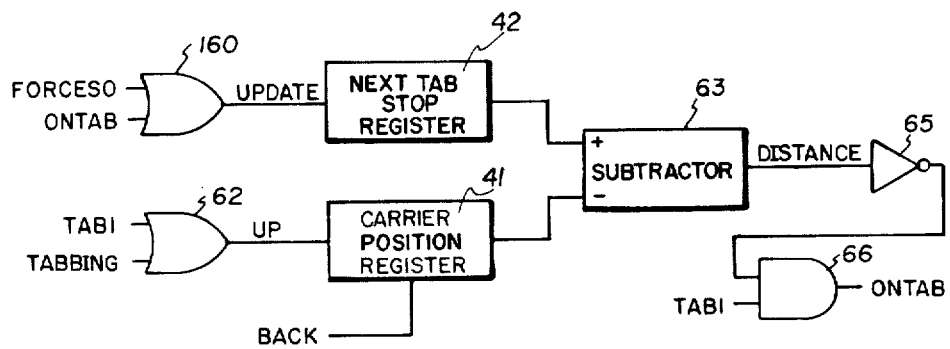
Figure 7B:
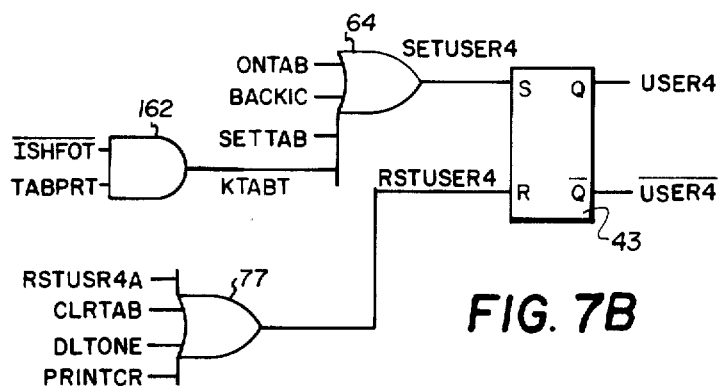
Figure 7C:
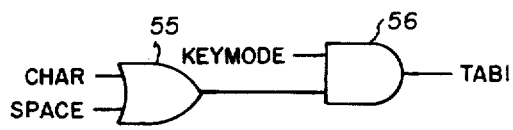

The position of the carrier 151 with respect to the left margin is maintained in the register 41 (FIG. 7A); and the position of the next tab stop in the tab rack 9 is maintained in the register 42. Each incremental escapement of the carrier 151 updates the register 41 by 1 through OR gate 62. A character or space in combination with the KEYMODE signal generates the TAB1 signal through OR gate 55 and AND gate 56 (FIG. 7C) and a TAB in combination with the KEYMODE signal through AND gate 57 and OR gate 58 sets the Tab latch 59 (FIG. 7D) and generates the TABBING signal. Once this escapement has occurred, the logic network of FIG. 7A determines if the carrier 151 has escaped to a tab stop. Specifically, this check is accomplished by comparing the respective outputs of the registers 41 and 42 by subtractor 63 with the results of the comparison being inverted by INVERTER 65 and gated through AND gate 66 to produce the ONTAB signal when the comparison is equal. When the carrier 151 has escaped to a tab stop, the character "t" is automatically printed (Line 4 of FIG. 20 being "high" through OR gate 76) the latch 43 (FIG. 7B) is set through OR gate 64 and the tab displacement data (DISPL) is gated through AND gate 170 (FIG. 8A) to the next buffer 6 for generation of the Tab Displacement Code (DISP). The register 42 is updated by the ONTAB signal through OR gate 160 to the value of the next tab stop.

Figure 8A:
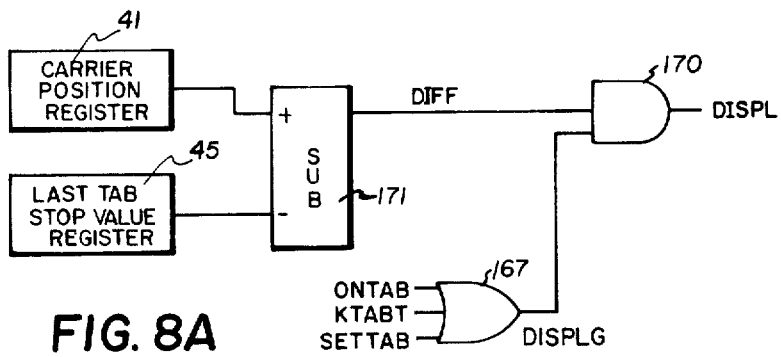
Figure 8B:
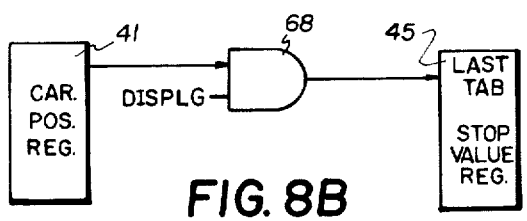

The tab displacement data represents the distance of the carrier 151 from the last tab stop (or the left margin, as the case may be) to the present tab stop (existing carrier position). This displacement is obtained by subtracting (in the subtractor 171 of FIG. 8A) the contents of the Last Tab Stop Register 45 from the output of the Carrier Position Register 41. Once the tab displacement data has been gated to the text buffer memory 6, the Last Tab Stop Register 45 is updated with the existing carrier position (FIG. 8B) by signal DISPLG from OR gate 67 (FIG. 8A) to AND gate 68.

Figure 7D:
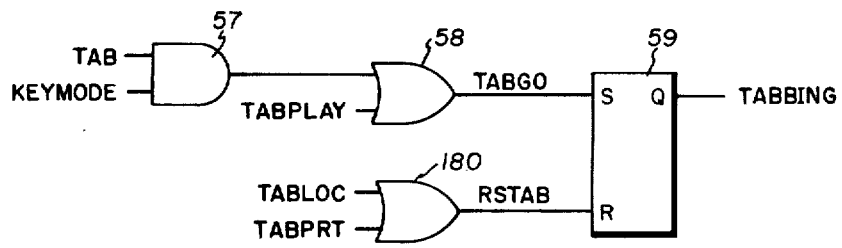
Figure 7E:
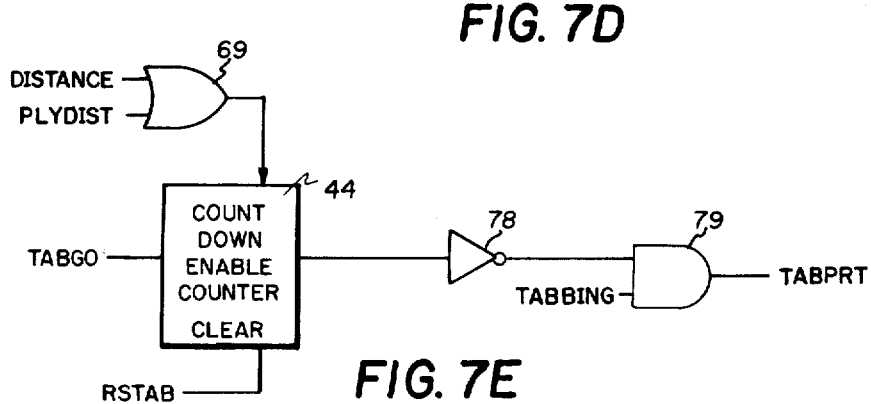
Figure 7F:
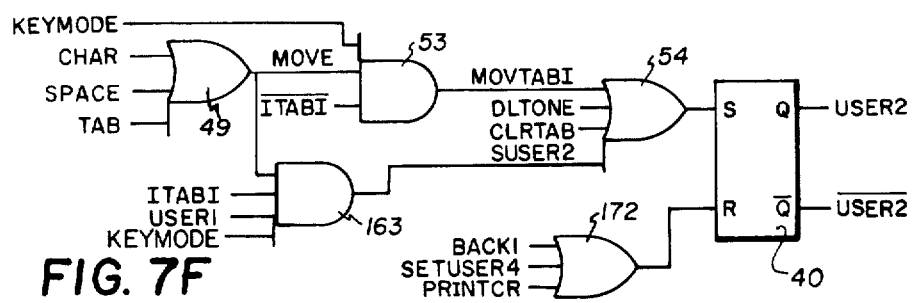
Figure 9:
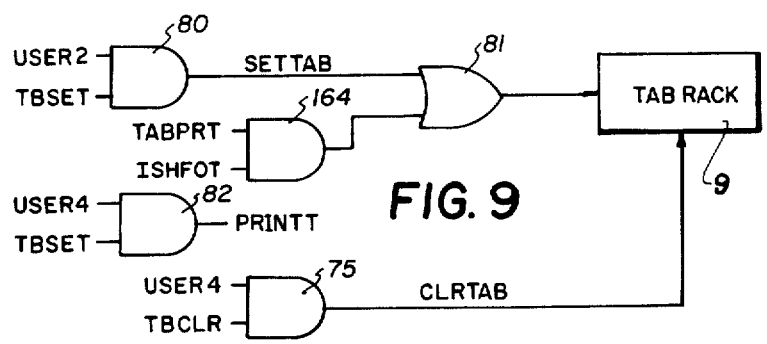

The control logic applicable to carrier escapement caused by "tabbing" is depicted in FIG. 7D. To decide when the carrier 151 has been moved to a tab stop in accordance with such "tabbing" the following procedure occurs: The distance to the next tab stop is loaded into a countdown counter 44 through OR gate 69 (FIG. 7E). For each incremental escapement of the carrier 151 during the "tabbing", this counter 44 is counted down by 1. When such counter 44 goes to zero, the tabbing is terminated by the signal TABPRT through INVERTER 78 and AND gate 79 which resets the tab latch 59 through OR gate 180 (FIG. 7D) since the tab stop has been reached. At this time, the code character "t" is again printed, the latch 43 is set, and the tab displacement data (Tab Displacement Code) is inserted into memory 6. As previously described, if TABLOC is implemented, there is no code character printing or memory insertion. As before, the Carrier Position Register 41 is updated to reflect the location of the carrier at the new tab setting. The logic network for setting the tabs in the tab rack 9 (as well as clearing same) is depicted in FIG. 9. The tab set key signal (TBSET) in combination with the signal indicating that the carrier 151 is away from the left margin (USER2) operate through AND gate 80 and OR gate 81 to set tab codes in the tab rack memory 9. The SETTAB output of AND gate 80 also sets the latch 43 through OR gate 64 generating the USER4 signal to indicate that the carrier 151 is located at a tab. The tab clear signal (TBCLR) in combination with the USER4 signal clears a tab from the tab rack memory 9 through AND gate 75. The CLRTAB signal also resets the latch 43 through OR gate 77 to indicate the carrier 151 is no longer located at a tab position. The CLRTAB signal generates the OPRINT through OR gate 140 to printer code generator 26 (FIG. 20) to control the printer 1 to print an "O" over the "t" indicating the tab has been cleared. If a Tab set key is actuated while the carrier 151 is at the left margin following the clearing of a tab, then latch 43 is set by TABPRT signal through AND gate 162. The combination of USER4 and TBSET into AND gate 82 produces a PRINTT signal on Line 1 through OR gate 72 to cause the printer code generator 26 to print a "t".

Figure 10A:
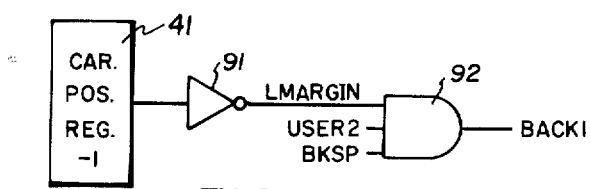
Figure 10B:
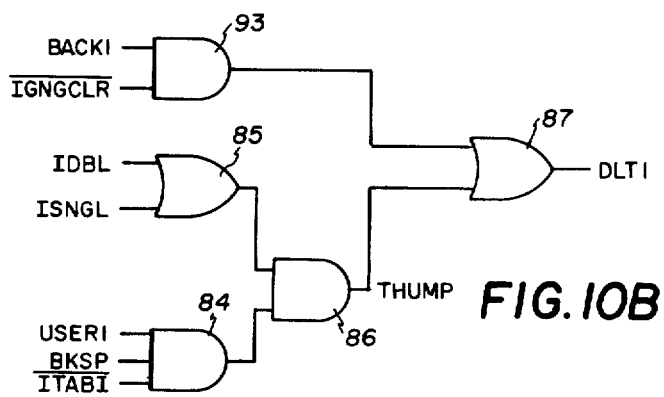
Figure 10C:
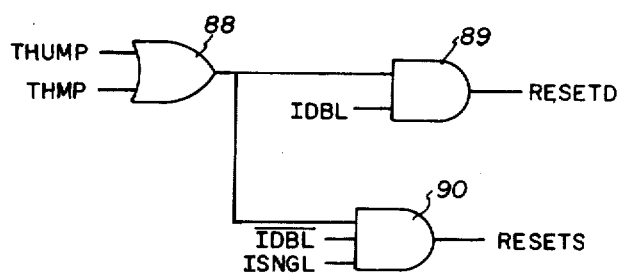

The logic control networks for effecting the backspace control during Error Correct Backspacing is depicted in FIGS. 10A-10I. Specifically, the logic networks depicted in FIG. 10A-10C are effective, when a backspace is keyed when the carrier 151 is at the left margin, to generate the signal DLT1 through OR gate 83 onto Line 5 (FIG. 21) to delete the Index Identifier Code from memory 6. The BKSP signal is gated through AND gate 84 and combined with single or double index signal from OR gate 85 at AND gate 86 to produce the DLT1 signal at OR gate 87. The THUMP signal from AND gate 86 into OR gate 88 combines with the single index signal ISNGL at AND gate 90 or the double index signal IDBL at AND gate 89 to produce signals RESETS or RESETD which reset the single index latch 31 through OR gate 46 or the double index latch 32 respectively. When the carrier 151 is one position to the right of the left margin the BKSP signal is combined with the output of INVERTER 91 at AND gate 92 and if no gang clear has been done, AND gate 93 will generate DLT1. The BACK1 signal also resets the USER2 latch 40 through OR gate 172. DLT1 also resets the latch 34 through OR gate 103. The generation of the signals Line 6 and DLT3 (FIG. 21) when a backspace is keyed after the Coded T or Coded T-gang clear sequence (to abort the Tab-Index Line) is effected by the logic gates 94, 95, 96, 97, 98 and 99 depicted in FIGS. 10D and 10E. During such sequence, the latch 60 (FIG. 10F) is set through OR gate 100 or 101 in order to update the format data, including the tab rack 9, up to the point of abort. In FIG. 10G backspacing off tab causes the next tab stop register 42 to be updated with the carrier position register 41 value through AND gate 102 under control of AND gate 165. The status and updating of the carrier position register 41 and last tab stop value register 45 during the error correct backspacing of tab stops, as previously described, is illustrated with respect to the logic controls of FIGS. 10H and 10I. The combination of the carrier 151 being more than one position from the left margin, being positioned at a tab position and a BKSP signal into AND gate 104 produces the signal DLTONE. The DLTONE signal resets latch 43 (FIg. 7B) through OR gate 77 to indicate that the carrier 151 is no longer positioned at a tab and sets latch 40 (FIG. 7F) through OR gate 54 to indicate that the carrier 151 is still away from the left margin. If the backspace places the carrier 151 at one position from the left margin then INVERTER 105 combines with the BKSP signal and USER4 signal at AND gate 106 to produce RSTUSR4A which resets latch 43 through OR gate 77. If a tab gang clear command has been entered then the IGNGCLR output of latch 33 (FIG. 6A) is combined with RSTUSR4A by AND gate 108 to produce signal DLT1A. If no tab gang clear command was entered, then the $\overline{\text{IGNGCLR}}$ output of latch 33 is combined with RSTUSR4A at AND gate 107 to produce the signal DLT2A. DLT1A and DLT2A produce the signals Line 5 and Line 6 through OR gates 83 and 109 respectively as described above. In FIG. 10I the content of register 41 is compared to register 45 with an equal compare producing signal BACK1C through INVERTER 110 and AND gate 111 to indicate that the backspace has placed the carrier 151 at a tab position. The BACK1C signal is input to printer code generator 26 through OR gate 166 to control the printer 1 to backspace. The output of gate 112 indicates that the carrier 151 is not at a tab position.

Figure 11B:
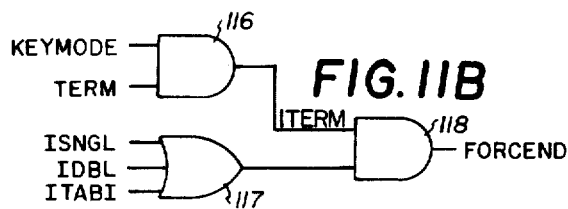
Figure 12:
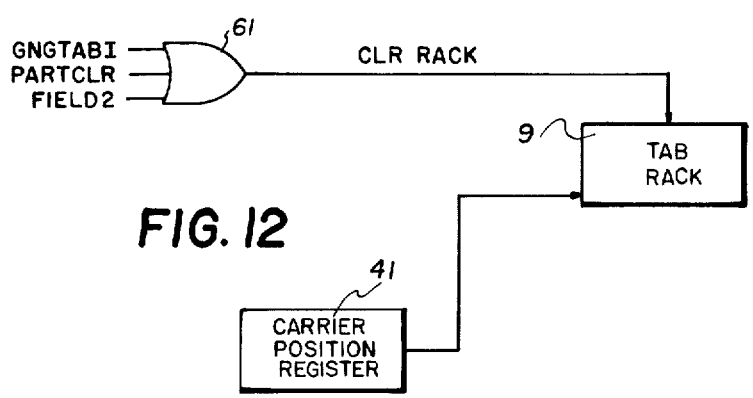
Figure 13:
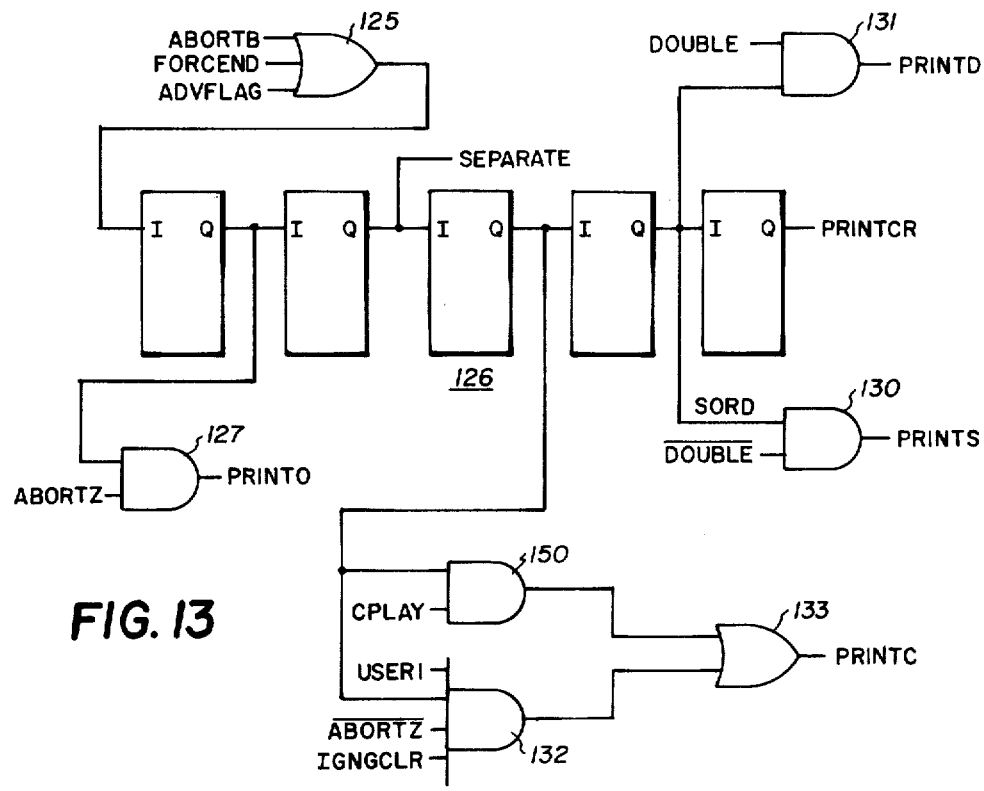

The logic control networks applicable to the process of terminating the Tab-Index Line are depicted in FIGS. 11A–11D; FIG. 12 depicts the clearance of the tab rack 9 during such termination sequence (as previously described); and the control networks for implementing the termination print sequence is depicted in FIG. 13. Referring to FIG. 11A, if a terminator (carrier return) is keyed while the carrier 151 is at the left margin (USER1) following the keying of a CODET, latch 115 is set through AND gate 113 and OR gate 114 to produce the abort signal ABORTZ. The ABORTB signal from OR gate 114 is input to OR gate 125 and enters the print control shift register 126. The coincidence of the ABORTZ signal and the output of the first stage of the shift register 126 at AND gate 127 produces signal PRINTO which is input to the print control generator 26 (FIG. 20) through OR gate 140 to cause the printer 1 to print a zero over the code character "T". The SEPARATE signal from the output of the second stage of shift register 126 is input to printer code generator 26 through OR gate 141 and causes forward escapement of the carrier 151 following printing. The PRINTCR signal from the output of the last stage of the shift register 126 is input to the printer code generator 26 to cause the printer 1 to carrier return. The PRINTCR signal also resets the latch 21 through OR gate 142 and provides a general reset signal throughout the logic.

FIG. 11B depicts the logic for terminating the Tab-Index Line after entry of index information. The termination signal TERM is combined with the KEYMODE from latch 22 at AND gate 116 to produce the signal ITERM. The single or double indexing signal from latches 31 or 32 (FIGS. 5A and 5B) or the ITABI signal from latch 34 (FIG. 6B) enters OR gate 117 and gates the ITERM signal through AND gate 118 to produce the FORCEND signal. The ITERM signal is input to AND gate 121 in combination with the double indexing signal IDBL and passes through OR gate 122 to set latch 123 and produce the signal DOUBLE if double indexing has been entered. The FORCEND signal enters the shift register 126 through OR gate 125 (FIG. 13) and is propagated through. The SEPARATE signal causes the printer 1 to advance the carrier 151 by one position and the DOUBLE signal is combined at AND gate 131 with the output from the fourth stage of the shift register 126 to produce the signal PRINTD to the printer code generator 26. The PRINTD signal causes the printer 1 to print a code character "D" indicating the double indexing mode. If single indexing was entered AND gate 128 and OR gate 129 generates the SNGLI signal to latch 123 to set the $\overline{\text{DOUBLE}}$ signal.

The $\overline{\text{DOUBLE}}$ signal is combined with the SORD output from the fourth stage of shift register 126 by AND gate 130 to produce the signal PRINTS to printer code generator 26. The PRINTS signal controls the printer 1 to print the code character "S" indicating single indexing.

If the tab gang clear signal was entered, then the output of the third stage of the shift register 126 into AND gate 132 generates the PRINTC signal at OR gate 133. The PRINTC signal is input to the printer code generator 26 to cause the printer 1 to print the code character "C" indicating that a gang clear of the tab rack 9 was entered.

Figure 11C:
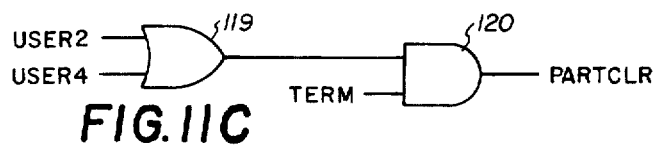
Figure 11D:
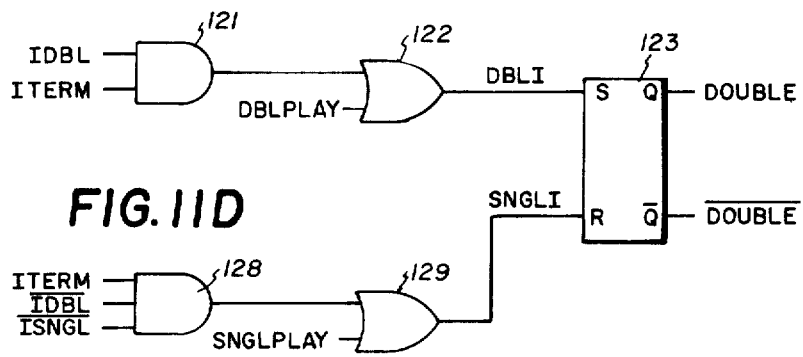

FIG. 11C depicts the logic for terminating the Tab-Index Line following entry of a character, space, or tab. If the printer 1 has moved the carrier 151 from the left margin position the USER2 will be set by latch 40 (FIG. 7F) or if the printer carrier 151 is located at a tab position the USER4 signal will be set by latch 43 (FIG. 7B). The output of OR gate 119 is gated by the terminator signal TERM through AND gate 120 to produce the signal PARTCLR. The PARTCLR signal is input to OR gate 61 (FIG. 12) to clear all tab settings to the right of the carrier position from the tab rack 9.

The logic applicable to, and implemented during the Tab-Index Line Playback Mode is depicted in FIGS. 15–19. Specifically, when the Shift Out Code (SO) is played out from the text buffer memory 6 by way of the memory decode module 51 (FIG. 14), the latch 70 (FIG. 15A) is set. If the next code played out is a Tab Index Identifier Code (TID), the latch 71 (FIG. 15B) is set through AND gate 134 to produce signal INTIC signifying the processing of the Tab-Index Line. The flag advance counter 73 (FIG. 15C) keeps track of the number of codes being outputted from memory 6 in the Tab-Index Line in order to advance the control flag during such processing. Adder 136 adds one to the flag advance counter 73 each time a code enters OR gate 135. The AND gates 137, 138 and 139 depicted in FIG. 16 indicate the number of indexing parameters (single or double). The first index code signal INDX1 decoded by memory decode 51 produces the signal ONE at AND gate 138 since latch 31 (FIG. 5A) is not set. The signal ONE sets latch 31 through OR gate 37 to indicate single indexing ISNGL. If a second INDX1 code is decoded then AND gate 139 produces the signal TWO which resets latch 31 through OR gate 46 and sets latch 32 (FIG. 5B) through OR gate 39 to indicate double indexing, IDBL.

Figure 18A:
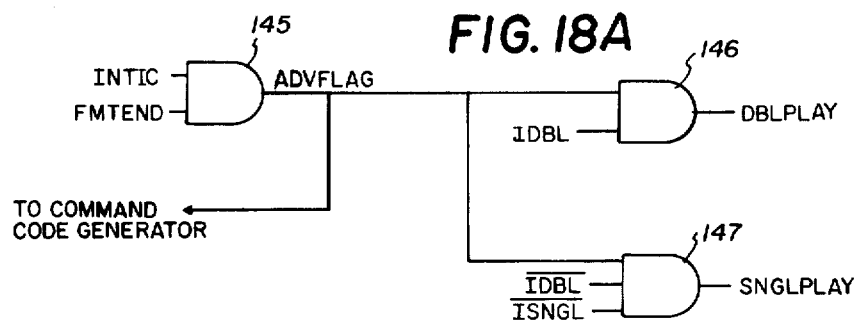
Figure 18B:
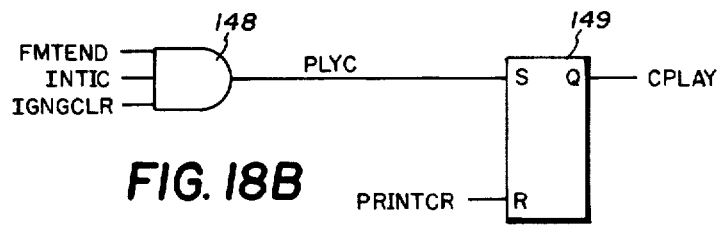
Figure 19:
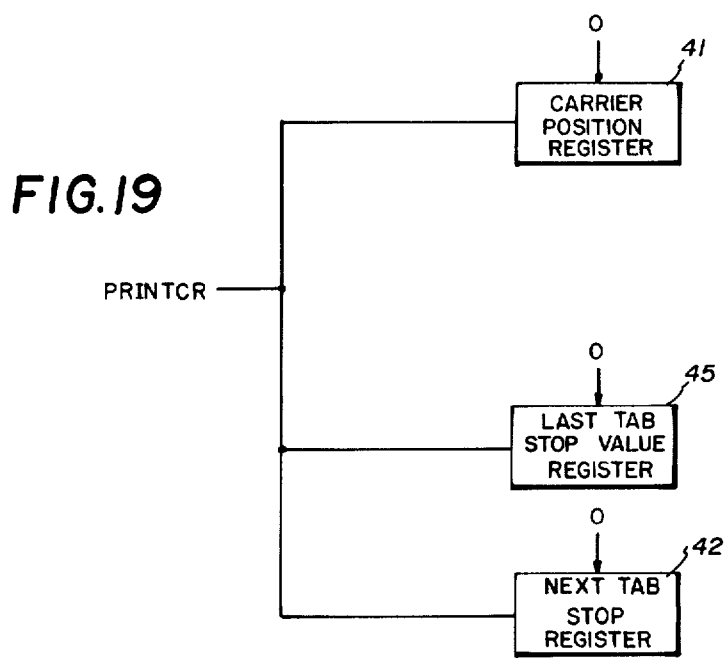

The control logic implemented during the playout of the Tab Identifier Code (TABI) and the Tab Displacement Code (DISP) is depicted in FIGS. 17A and 17B. The TABI signal generates the FIELD2 signal at the output of AND gate 142 which sets the tab identifier latch 34 through OR gate 48. The ITABI output of latch 34 generates the TABPLAY signal from AND gate 143 which sets the tabbing latch 59 through OR gate 58 and enables AND gate 144 to play the tab displacement out of memory 6 through memory decode 51 and OR gate 69 into counter 44 (FIG. 7E). Counter 44 is enabled by the TABGO output from OR gate 58 and counts down carrier escapement until the tab position is reached, AND gate 79 then generates the signal TABPRT to printer code generator 26 (FIG. 20) as previously described. The TABPRT signal is gated through AND gate 164 by signal ISHFOT from the shift out latch 70 to set a tab code in tab rack 9 through OR gate 81. The control logic assisting in the implementation of control signals during the playout of the Format End Code (FMTEND) is depicted in FIGS. 18A and 18B. The decoding of a FMTEND code by memory decode 51 (FIG. 14) generates the ADVFLAG signal at the output of AND gate 145. The ADVFLAG signal produces an output from AND gate 146 if double indexing latch 32 has been set or produces an output from AND gate 147 if single indexing has been set. ADVFLAG also initiates the sequence through shift register 126 (FIG. 13) through OR gate 125. The output of AND gate 146 or AND gate 147 sets the DOUBLE or $\overline{\text{DOUBLE}}$ signal at latch 123 through OR gate 122 or OR gate 129, respectively. The DOUBLE or $\overline{\text{DOUBLE}}$ signal produces the control signal PRINTD or PRINTS (FIG. 13) to cause printer code generator 26 to command the printer 1 to print a code character "D" or "S" as previously described.

In FIG. 18B if a tab gang clear latch 33 code was set by the TABI signal through AND gate 142 and OR gate 47 then AND gate 148 generates the signal PLYC in response to the FMTEND code to set latch 149 and produce the signal CPLAY. CPLAY is combined with the output of the third stage of shift register 126 at AND gate 150 to produce the PRINTC signal at OR gate 133. The PRINTC signal is input to printer code generator 26 to cause the printer 1 to print code character "C" indicating that a tab gang clear was executed. The carrier return signal PRINTCR to the printer code generator 26 (FIG. 20) resets (FIG. 19) all registers, counters, latches, etc. associated with the Tab-Index Line.

It is contemplated that various changes and additions to the aforedescribed process and apparatus may be made by one skilled in the art without departing from the basic concept of the present invention. For example, the particular type of code characters are only illustrative and other character representations may be employed. Furthermore, while the aforementioned process and apparatus assumes the actual printing of the code characters, the same concepts and techniques are equally applicable to any type of operator readable output, including a wide variety of visual displays.

Various other modifications to the enclosed embodiments, as well as alternate embodiments, of the process and apparatus of the present invention may become apparent to one skilled in the art without departing from the spirit and scope of the invention as defined by the appended claims.

What is claimed is:

1. In a word processing system of the type including an output printer having a conventional carrier, input keyboard means for generating text codes representative of text to be printed by said output printer and instruction codes representative of the format by which said text is to be printed, memory means for storing said text codes and said instruction codes, and an electronic tab rack for storing tab codes representing tab stops for the carrier of said printer, the improvement comprising:
   (a) first means responsive to said input keyboard means for generating a string of instruction codes respectively representing the beginning of the instruction code string, the indexing parameter of said format, the location of tab stops for said printer, and the termination of said instruction code string,
   (b) second means for introducing said instruction code string into said memory means,
   (c) third means responsive to said input keyboard means for establishing a grid of tab settings within said tab rack,
   (d) fourth means for controlling the printing by said printer of a line of code characters respectively corresponding only to each of said instruction codes of said code string, and
   (e) fifth means for moving the printer carrier to the respective positions of said tab settings so that the printing of each instruction code character representing the corresponding tab stop location code occurs at a position along said line of code characters corresponding to the tab setting position.

2. The improvement as defined in claim 1 wherein said fourth means effects the selective over-printing of a code character with a second code character in response to a signal from said input keyboard for the deletion from memory of the instruction code represented by said code character.

3. The apparatus as defined by claim 2 further comprising means for effecting a carrier return in response to the generation of the termination code of said instruction code string.

4. In the operation of a word processing system, a method for displaying the status of indexing parameters and tab settings of a format for text to be printed by a printer of such word processing system having a printer carrier, said method comprising the steps of:
   (a) generating a string of instruction codes respectively representative of the beginning of the instruction code string, the indexing parameter of said format, the location of tab stops for the carrier of said printer, and the termination of said instruction code string,
   (b) storing said string of instruction codes in a memory,
   (c) establishing a grid of tab settings within an electronic tab rack, and
   (d) printing a line of code characters respectively corresponding to each of the instruction codes of said instruction code string wherein the code characters corresponding to tab stops are printed at locations along said line corresponding to the position of the tab settings.

5. In a word processing system of the type including an output printer, a printer carrier, input keyboard means for generating text codes representative of text to be printed by said output printer and instruction codes representative of the format by which said text is to be printed, memory means for storing said text codes and said instruction codes, and an electronic tab rack for storing a grid of tab settings for said carrier, the improvement comprising:
   (a) first means responsive to said input keyboard means for generating a string of codes, said code string including tab displacement codes respectively representative of the location of tab stops for said carrier,
   (b) second means for introducing said code string, including said tab displacement codes, into said memory means,
   (c) third means responsive to said input keyboard means for establishing said grid of tab settings within said tab rack,
   (d) fourth means responsive to the translation of said carrier to an existing tab setting to cause said second means to introduce into said memory a tab displacement code representative of a tab stop previously stored in said tab rack; and (e) means responsive to said fourth means for controlling said printer to print a code character representative of the tab stop at the position of the tab stop on the printing line.

6. The improvement as defined by claim 5 further including fifth means reponsive to an input from said keyboard means for deleting the tab displacement code from said memory corresponding to a tab stop previously stored in said tab rack and controlling said printer to print a second code over said code character representative of the tab stop indicating deletion of the tab stop.

7. In a word processing system of the type including an output printer, a printer carrier, input keyboard means for generating text codes representative of text to be printed by said output printer and instruction codes representative of the format by which said text is to be printed, memory means for storing said text codes and said instruction codes, and an electronic tab rack for establishing a grid of tab settings for said carrier, the improvement comprising:

(a) first means responsive to said input keyboard means for generating a string of instruction codes, said code string including tab displacement codes respectively representative of the location of tab stops for said carrier and an index identifier code representative of the indexing parameter of said format, (b) second means for introducing said code string, including said tab displacement codes and index identifier code, into said memory means, (c) third means responsive to said input keyboard means for establishing said grid of tab settings within said tab rack, (d) fourth means for controlling said output printer to print a line of code characters, including a mode code character defining the characters that follow as instruction code characters, a code character representative of tab setting printed at the location of the tab setting along the printing line, and a code character representative of the index identifier code, and (e) fifth means responsive to the back-spacing of said carrier along said printing line to delete from memory each instruction code back-spaced to while controlling said printer to produce a visual indication of the deletion of the instruction code from memory.

* * * * *

UNITED STATES PATENT AND TRADEMARK OFFICE
CERTIFICATE OF CORRECTION

PATENT NO. : 4,240,758
DATED : December 23, 1980
INVENTOR(S) : R. G. Acosta

It is certified that error appears in the above-identified patent and that said Letters Patent are hereby corrected as shown below:

Claim 6, line 12, following "code", first occurrence, insert --character--.

Signed and Sealed this

Twenty-eighth Day of April 1981

[SEAL]

Attest:

RENE D. TEGTMEYER

Attesting Officer

Acting Commissioner of Patents and Trademarks